F. MÜHLBACH.
HORSESHOE ATTACHMENT SECURING MEANS.
APPLICATION FILED FEB. 26, 1915.
1,153,101.
Patented Sept. 7, 1915.
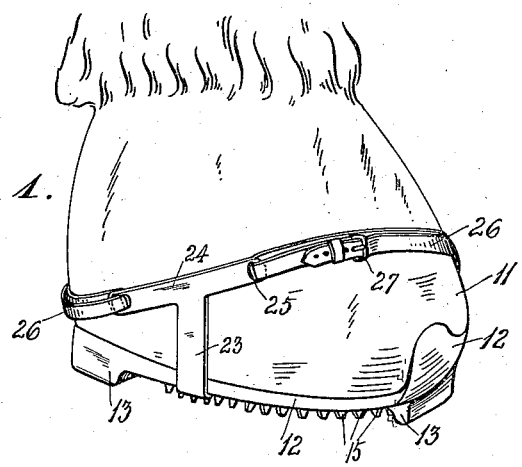
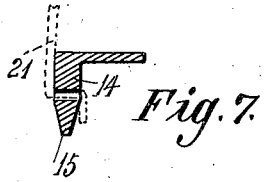
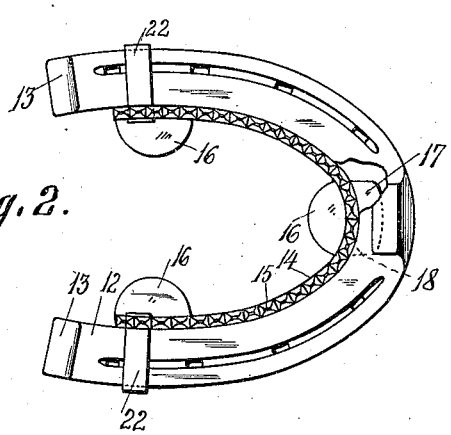
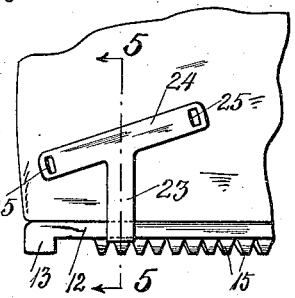
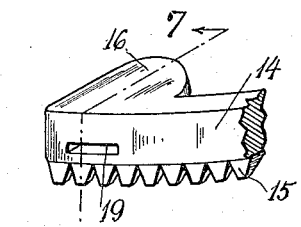
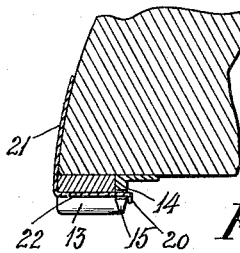
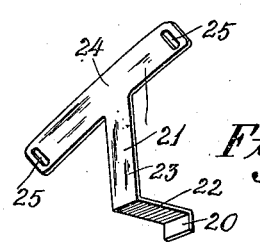
Witnesses:
Fred Rogers.
Oladar Hamburger
Inventor
Ferdinand Mühlbach.
By his Attorney
Alexander Kruez

UNITED STATES PATENT OFFICE.

FERDINAND MÜHLBACH, OF NEW YORK, N. Y.

HORSESHOE-ATTACHMENT-SECURING MEANS.

1,153,101.  Specification of Letters Patent.  Patented Sept. 7, 1915.

Application filed February 26, 1915. Serial No. 10,745.

*To all whom it may concern:*

Be it known that I, FERDINAND MÜHLBACH, a subject of the Emperor of Austria-Hungary, and a resident of New York, in the county of New York and State of New York, have invented new and useful Improvements in Horseshoe - Attachment - Securing Means, of which the following is a specification.

This invention relates to an anti-slipping attachment to horse-shoes and has as its principal object to provide means adapted to prevent effectively the slipping of an animal's feet equipped therewith.

A further object of my invention is to provide such means readily attachable to and detachable from the hoof provided with the usual horseshoe.

A final object of my invention is to provide a device of the character described, combining simplicity of construction and consequent low cost of manufacture with efficiency and practicability in use.

In the accompanying drawing: Figure 1 is a perspective view of my device attached to the hoof of an animal being shod with the common horse-shoe. Fig. 2 is a bottom view thereof. Fig. 3 is a fractional side-elevational view of the same. Fig. 4 is a fractional, perspective view of a detail of my device, on an enlarged scale. Fig. 5 is a vertical cross section taken on the line 5—5 of Fig. 3. Fig. 6 is a perspective detail view. Fig. 7 is a vertical section taken on the line 7—7 of Fig. 4.

The same part is designated by the same reference character throughout the several views.

Referring more particularly to the drawing, 11 is the hoof of an animal shod with a common horse-shoe 12 having calks 13. Inside of and lying close against the horse-shoe 12 I provide a scraper 14 having teeth 15 made in its bottom edge the points of which are at a level with the lower ends of the calks 13 so that the weight of the animal is mainly supported by the horse-shoe. In order to prevent any injurious effect of the upper edge of the scraper 14 on the hoof, horizontal flanges 16 are provided thereon, one at either end and one at the middle, as illustrated. An outwardly projecting tongue 17 is further provided at the apex of the scraper 14, adapted to be engaged by a recess 18 formed at a corresponding part between the hoof and the horse-shoe. Slots 19 are provided in the sides of the scraper 14, one near each end thereof, adapted to engage the downwardly projecting ends 20 of clamping members 21 which then are continued horizontally under the horse-shoe, as at 22 and then vertically over the sides of the hoof as at 23. An oblique cross piece 24 is formed on top of the clamping members 21, having an ear 25 provided in each end thereof, into which are slung straps 26 adapted to be fastened with buckles 27 in an obvious manner. On unbuckling the straps, the clamping members may easily be withdrawn from the scraper and the latter in its turn removed from the hoof for repair or for replacing. The scraper does not extend to the rear calks of the horse-shoe so as to leave the latter free to act too.

Having thus shown and described my invention, what I claim is:

In a device of the character described, angular braces each having a thin, integral, substantially T-shaped upper part disposed centrally against the exterior of a horse's hoof the top-bar of said T-shaped bar being oblique, ears formed at each end of said top-bar and a pair of straps provided with buckles for securing said braces to the horse's hoof, said strap extending obliquely from the bottom of the heel over the toe of the hoof.

FERDINAND MÜHLBACH.

Witnesses:
OTTO BUSCEK,
ALEXANDER DENES.

Copies of this patent may be obtained for five cents each, by addressing the "Commissioner of Patents, Washington, D. C."